United States Patent
Yu et al.

(10) Patent No.: US 11,809,410 B1
(45) Date of Patent: Nov. 7, 2023

(54) SYSTEMS AND METHODS FOR ASSIGNING COLORS TO NODES OF A SUBGRAPH

(71) Applicant: Cisco Technology, Inc., San Jose, CA (US)

(72) Inventors: Kuai Yu, Milpitas, CA (US); Alok Khambatkone, San Jose, CA (US); Shishir Gupta, Santa Clara, CA (US); Anbu Gunalan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 78 days.

(21) Appl. No.: 16/860,907

(22) Filed: Apr. 28, 2020

Related U.S. Application Data

(60) Provisional application No. 62/946,299, filed on Dec. 10, 2019.

(51) Int. Cl.
  *G06F 16/901* (2019.01)
  *G06F 16/904* (2019.01)
  *G06F 16/23* (2019.01)

(52) U.S. Cl.
  CPC ...... *G06F 16/2379* (2019.01); *G06F 16/9024* (2019.01); *G06F 16/904* (2019.01)

(58) Field of Classification Search
  None
  See application file for complete search history.

(56) References Cited

U.S. PATENT DOCUMENTS

| | | | |
|---|---|---|---|
| 7,773,558 B2 | 8/2010 | Cho et al. | |
| 8,826,256 B2 | 9/2014 | Doyle et al. | |
| 9,182,957 B2 | 11/2015 | Craymer | |
| 10,209,963 B2 | 2/2019 | Hutchison | |
| 10,887,225 B1* | 1/2021 | Chan | H04L 45/04 |
| 2008/0232347 A1* | 9/2008 | Chao | H04L 45/50 370/351 |
| 2013/0097463 A1* | 4/2013 | Marvasti | H04L 41/142 714/47.1 |
| 2015/0023328 A1* | 1/2015 | Thubert | H04W 72/0446 370/336 |
| 2019/0278607 A1 | 9/2019 | Higgins | |

OTHER PUBLICATIONS

Github, Inc., Aristanetworks/EosSdk, https://github.com/aristanetworks/EosSdk/blob/master/ip_route.cpp, downloaded Apr. 22, 2020, 3 pages.

* cited by examiner

*Primary Examiner* — Giuseppi Giuliani
(74) *Attorney, Agent, or Firm* — Baker Botts L.L.P.

(57) ABSTRACT

In one embodiment, a method includes generating a subgraph from a dependency graph. The subgraph includes one or more potential paths between an event interest node and an event generator node of the dependency graph. The method also includes activating the event interest node and assigning, in response to activating the event interest node, a color to nodes along the one or more potential paths of the subgraph from the event interest node to the event generator node. The method further includes modifying the event generator node and modifying, in response to modifying the event generator node, one or more of the nodes along the one or more potential paths of the subgraph from the event generator node to the event interest node.

17 Claims, 6 Drawing Sheets

SYSTEMS AND METHODS FOR ASSIGNING COLORS TO NODES OF A SUBGRAPH

CROSS-REFERENCE TO RELATED APPLICATIONS

This application claims benefit of U.S. Provisional Application No. 62/946,299 filed Dec. 10, 2019, by Kuai Yu et al., and entitled "Forwarding Software Modularization and Optimizations; Colored Path Object Tracking in Network Object Tree," which is incorporated herein by reference.

TECHNICAL FIELD

This disclosure generally relates to assigning colors to nodes, and more specifically to systems and methods for assigning colors to nodes of a subgraph.

BACKGROUND

A software representation of network nodes typically forms a dependency chain or a directed acyclic graph. In certain instances, a network event may update a node in this graph, which requires modifying the dependent nodes. The dependent nodes may be modified by using specialized code that is included in each intermediate node of the graph. However, vigilant code reviews are required to capture any additional intermediate nodes that may be added in the future.

BRIEF DESCRIPTION OF THE DRAWINGS

To assist in understanding the present disclosure, reference is now made to the following description taken in conjunction with the accompanying drawings, in which.

DESCRIPTION OF EXAMPLE EMBODIMENTS

Overview

Figure 1:
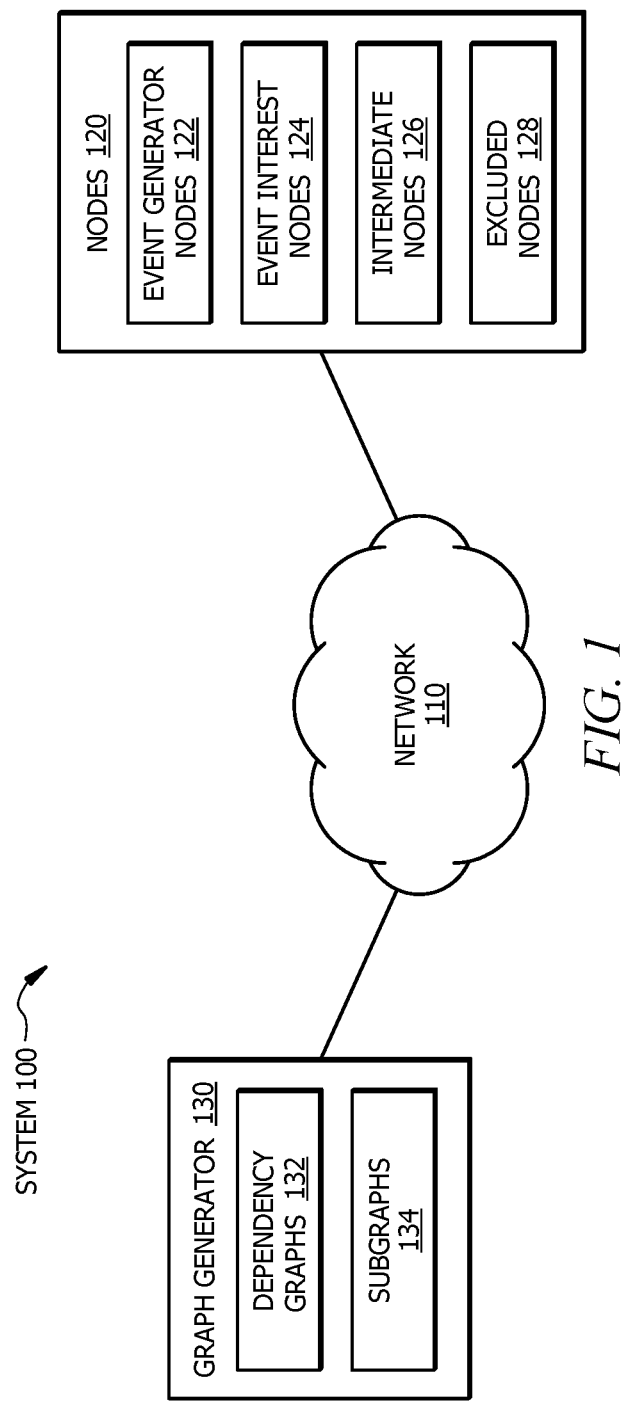
FIG. 1 illustrates an example system for assigning colors to nodes of a subgraph.

According to an embodiment, a router includes one or more processors and one or more computer-readable non-transitory storage media coupled to the one or more processors. The one or more computer-readable non-transitory storage media include instructions that, when executed by the one or more processors, cause the router to perform operations including generating a subgraph from a dependency graph. The subgraph includes one or more potential paths between an event interest node and an event generator node of the dependency graph. The operations also include activating the event interest node and assigning, in response to activating the event interest node, a color to nodes along the one or more potential paths of the subgraph from the event interest node to the event generator node. The operations further include modifying the event generator node and modifying, in response to modifying the event generator node, one or more of the nodes along the one or more potential paths of the subgraph from the event generator node to the event interest node.

In certain embodiments, generating the subgraph from the dependency graph occurs during a compile time. In some embodiments, assigning the color to the nodes along the one or more potential paths of the subgraph occurs during a run time. Activating the event interest node may include configuring a feature on the router. The color may be a label indicating that the node is subject to tracking.

In certain embodiments, the operations include deleting the event interest node, modifying the event generator node, and deleting, in response to deleting the event interest node and modifying the event generator node, the color from the nodes along the one or more potential paths of the subgraph from the event generator node to the event interest node. In some embodiments, modifying the event generator node includes one of the following: changing a next-hop, changing a virtual output queueing (VOQ) identification, changing an equal-cost multi-path (ECMP) routing, or changing a link aggregation group (LAG). In certain embodiments, the operations further include defining relationships between a plurality of nodes of the dependency graph and generating a plurality of subgraphs from the dependency graph. Each of the plurality of subgraphs may include the event generator node and a unique event interest node.

According to another embodiment, a method includes generating a subgraph from a dependency graph. The subgraph includes one or more potential paths between an event interest node and an event generator node of the dependency graph. The method also includes activating the event interest node and assigning, in response to activating the event interest node, a color to nodes along the one or more potential paths of the subgraph from the event interest node to the event generator node. The method further includes modifying the event generator node and modifying, in response to modifying the event generator node, one or more of the nodes along the one or more potential paths of the subgraph from the event generator node to the event interest node.

According to yet another embodiment, one or more computer-readable non-transitory storage media embody instructions that, when executed by a processor, cause the processor to perform operations including generating a subgraph from a dependency graph. The subgraph includes one or more potential paths between an event interest node and an event generator node of the dependency graph. The operations also include activating the event interest node and assigning, in response to activating the event interest node, a color to nodes along the one or more potential paths of the subgraph from the event interest node to the event generator node. The operations further include modifying the event generator node and modifying, in response to modifying the event generator node, one or more of the nodes along the one or more potential paths of the subgraph from the event generator node to the event interest node.

Technical advantages of certain embodiments of this disclosure may include one or more of the following. Certain embodiments of this disclosure assign colors to nodes of a subgraph upon activation (e.g., creation) of an event interest node and delete the colors from the nodes of the subgraph upon deactivation (e.g., removal) of the event interest node, which preserves network resources. In certain embodiments, rather than deleting the colors from nodes at the time the event interest node is deactivated, the event generator node "lazy deletes" the color from each colored node when another graph traversal occurs, which provides for better forwarding convergence. In some embodiments, only a few lines of code (e.g., JavaScript Object Notation (JSON) code) are required to assign and delete colors from the nodes, which allows for fast and accurate deployment.

Certain embodiments of this disclosure include systems and methods for network parent node tracking that dynamically adjusts to multiple levels of hierarchy. For example, tracking may be maintained if a network event changes a recursive route to a non-recursive route (or vice versa). In some embodiments, the network parent node tracking does not scale with a number of routes. For example, if only a few routes track a particular interface or LAG, changes at the root level will only reach the few routes that have registered for changes.

In certain embodiments of this disclosure, to ensure accuracy in the graph traversal, ownership of the logic is within dynamically generated code. For example, a dependency graph may be dynamically generated during every code compilation so that if a developer changes the dependency chain, no code change is required to maintain accuracy. Since the ownership of the graph traversal accuracy does not belong to any forwarding feature owner, the modularity of the code base is increased.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
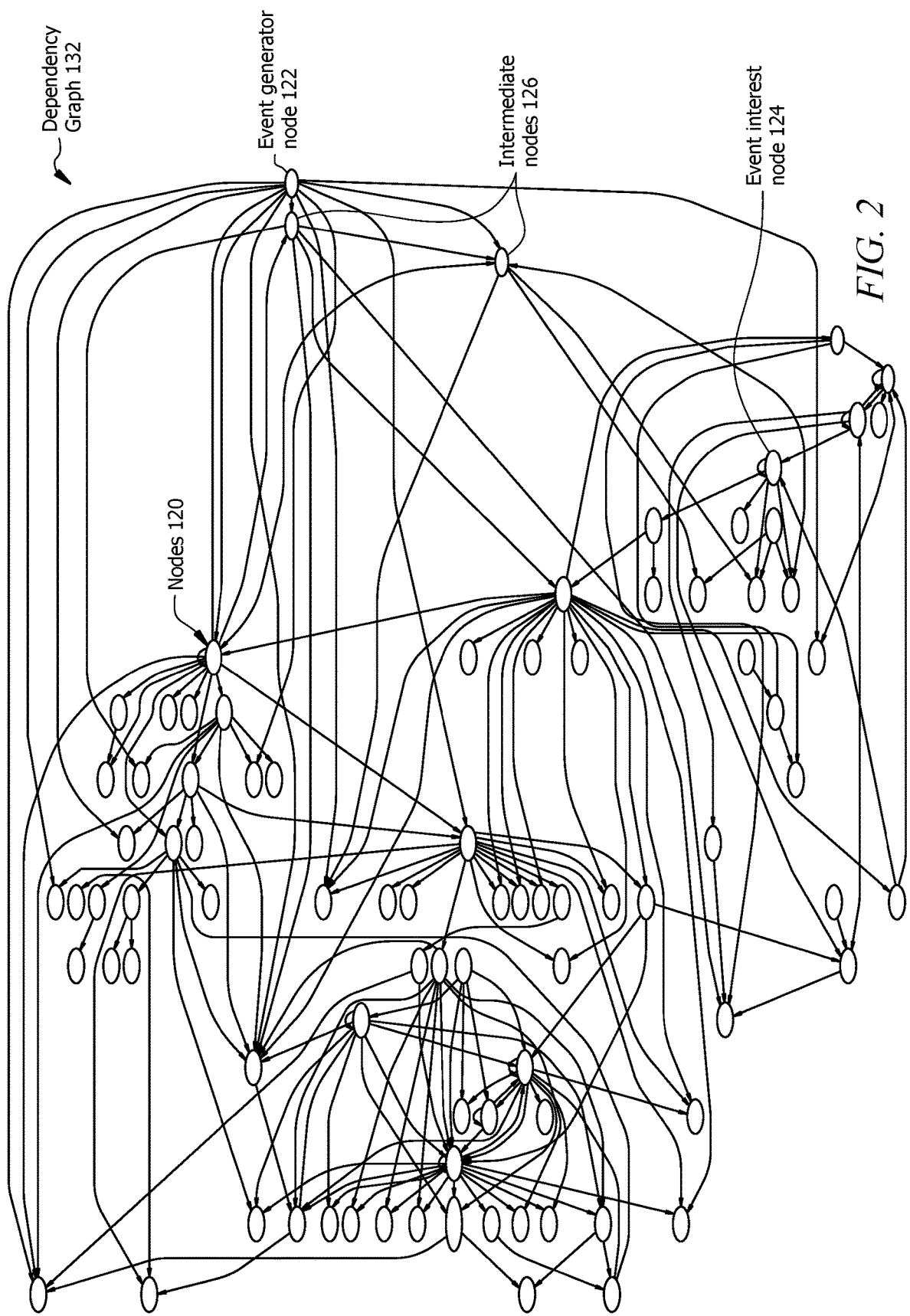
FIG. 2 illustrates an example dependency graph that may be used by the system of FIG. 1.
Figure 3:
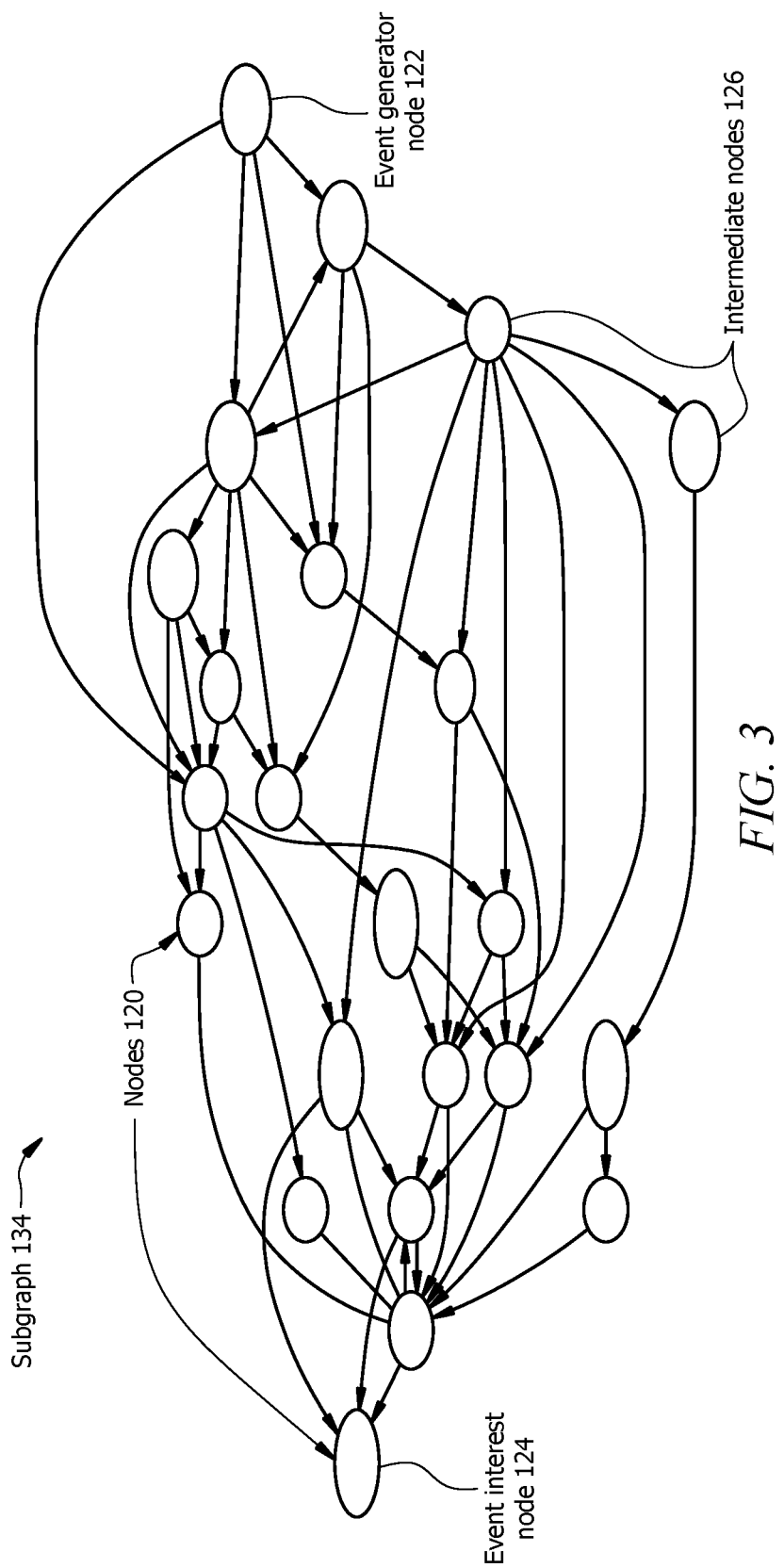
FIG. 3 illustrates an example subgraph that may be generated from the dependency graph of FIG. 2.
Figure 4:
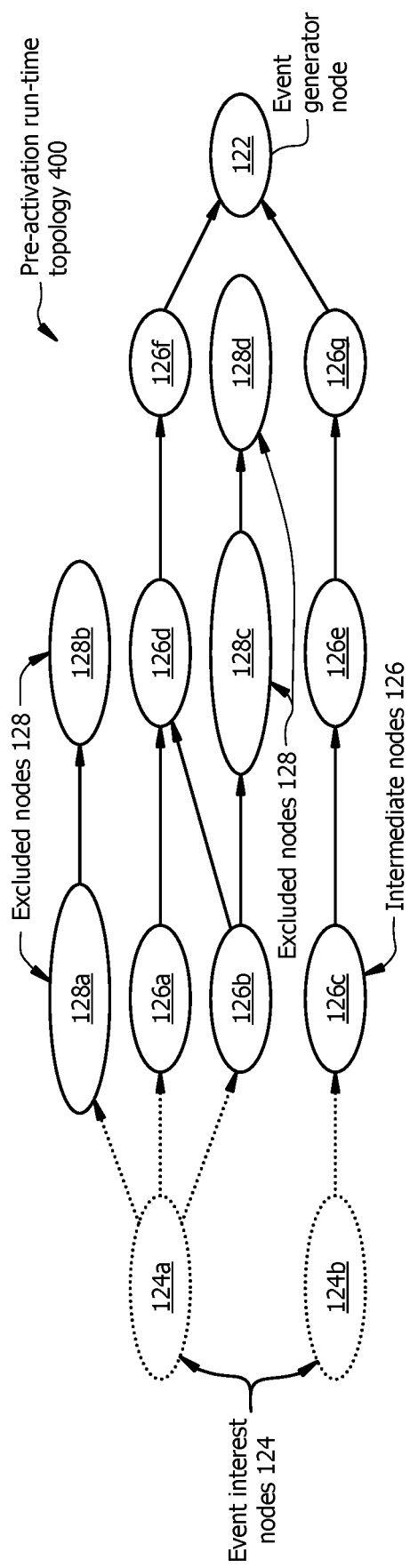
FIG. 4 illustrates an example run-time topology of the subgraph of FIG. 3 prior to activation of an event interest node.
Figure 5:
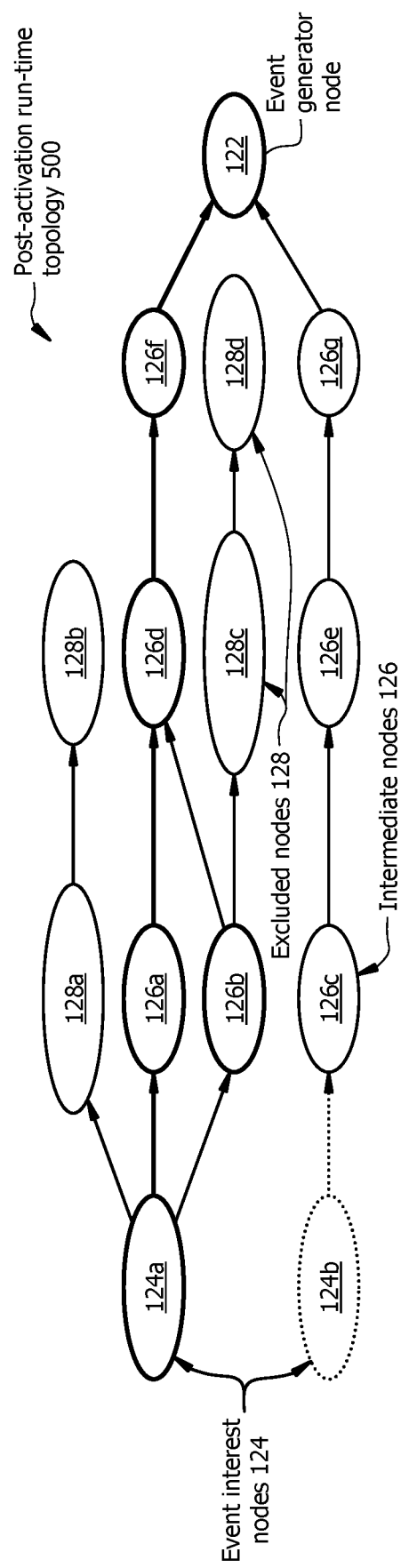
FIG. 5 illustrates an example run-time topology of the subgraph of FIG. 3 after activation of the event interest node.
Figure 6:
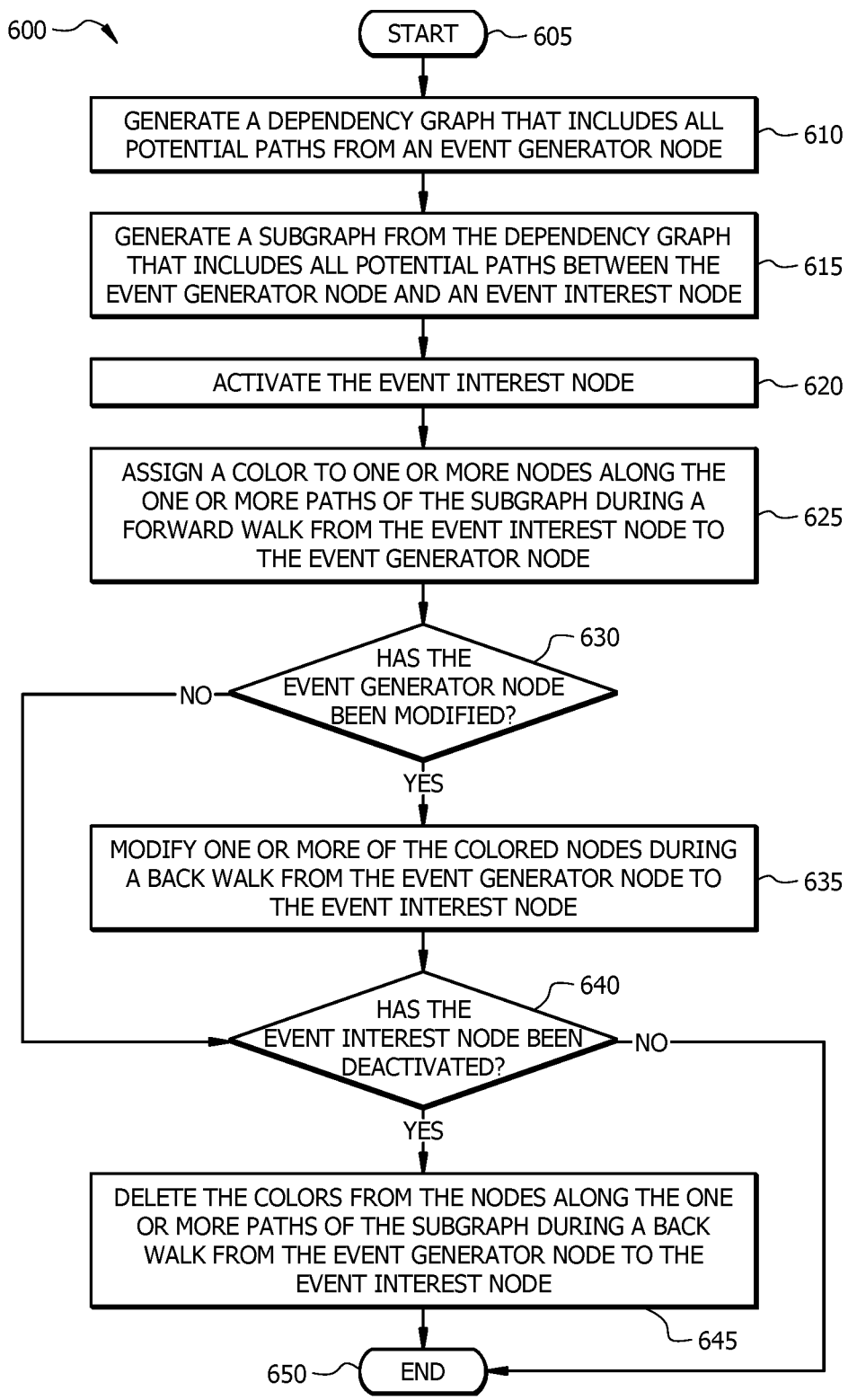
FIG. 6 illustrates an example method for assigning colors to nodes of a subgraph.
Figure 7:
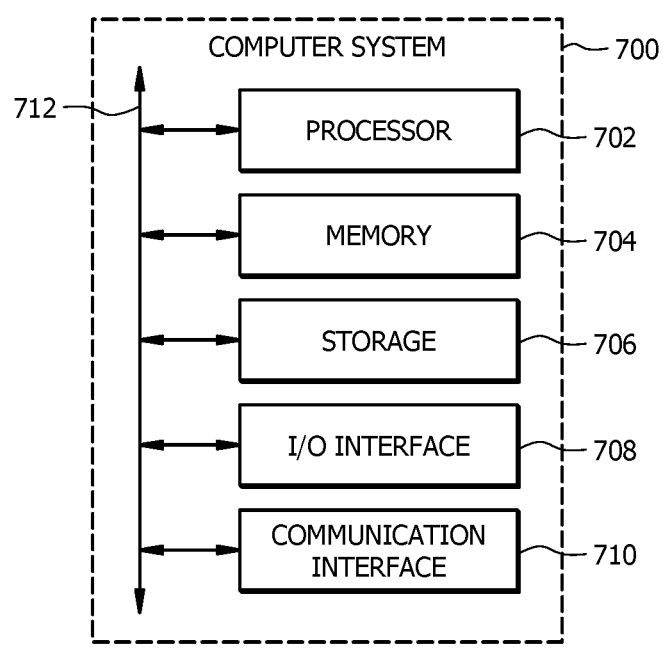
FIG. 7 illustrates an example computer system that may be used by the systems and methods described herein.

This disclosure describes systems and methods for assigning colors to nodes of a subgraph. FIG. 1 shows an example system for assigning colors to nodes of a subgraph. FIG. 2 shows an example dependency graph that may be used by the system of FIG. 1, and FIG. 3 shows an example subgraph that may be generated from the dependency graph of FIG. 2. FIG. 4 shows an example run-time topology of the subgraph of FIG. 3 prior to activation of an event interest node, and FIG. 5 shows an example run-time topology of the subgraph of FIG. 3 after activation of the event interest node. FIG. 6 shows an example method for assigning colors to nodes of a subgraph. FIG. 7 shows an example computer system that may be used by the systems and methods described herein.

FIG. 1 illustrates an example system 100 for assigning colors to nodes of a subgraph. System 100 or portions thereof may be associated with an entity, which may include any entity, such as a business or company that assigns colors to nodes of a subgraph. The components of system 100 may include any suitable combination of hardware, firmware, and software. For example, the components of system 100 may use one or more elements of the computer system of FIG. 7. System 100 of FIG. 1 includes a network 110, nodes 120, and a graph generator 130.

Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an internet service provider (ISP) network, and the like.

Nodes 120 of system 100 are connection points within network 110 that receive, create, store and/or send traffic along a path. Nodes 120 may include one or more endpoints and/or one or more redistribution points that recognize, process, and forward traffic to other nodes 120. Nodes 120 may include virtual and/or physical network nodes. In certain embodiments, one or more nodes 120 include data equipment such as routers, servers, switches, bridges, modems, hubs, printers, workstations, and the like.

Nodes 120 of system 100 include event generator nodes 122, event interest nodes 124, intermediate nodes 126, and excluded nodes 128. Event generator nodes 122 represent nodes 120 that indicate the state of a network function element such as a next hop or queue availability. Event interest nodes 124 represent nodes 120 that indicate a network service state availability for the network function state. Intermediate nodes 126 represent nodes 120 along a potential path between event generator nodes 122 and event interest nodes 124. In certain embodiments, intermediate nodes 126 are assigned a color upon activation of an associated event interest node 124. Excluded nodes 128 represent nodes 122 that are not part of any potential path between event generator nodes 122 and event interest nodes 124. In certain embodiments, excluded nodes 128 are not assigned a color upon activation of an associated event interest node 124. One or more nodes 120 within network 110 may receive traffic from other components of network 110. For example, intermediate nodes 126 may receive traffic from event generator nodes 122, event interest nodes 124 may receive traffic from intermediate nodes 126, and so on.

Graph generator 130 of system 100 is a component that generates dependency graphs 132 and subgraphs 134 using nodes 120 of network 110. Graph generator 130 may identify the relationships between nodes 120 based on user input. For example, a user of graph generator 130 may define the relationships between nodes 120 using an encoding scheme (e.g., JSON). Graph generator 130 may identify event generator nodes 122 and event interest nodes 124 from nodes 120 based on user input. For example, a user of graph generator 130 may define event generator nodes 122 and event interest nodes 124 using an encoding scheme (e.g., JSON).

In certain embodiments, during compile time, graph generator 130 of system 100 automatically generates code that is used to build dependency graphs 132 and subgraphs 134. Graph generator 130 may identify all potential paths between event generator node 122 and each event interest node 124. In some embodiments, graph generator 130 writes global constants in a general-purpose, procedural computer programming language (e.g., C, C++, etc.). The global constants may take into account all relationships between nodes 120 of dependency graph 132.

In some embodiments, during run time, one or more nodes 120 are activated (e.g., created or enabled) and form relationships with other nodes 120 depending on the rules generated by graph generator 130 during compile time. When a particular event interest node 124 is activated and linked to other nodes 120, that particular event interest node 124 will traverse, from event interest node 124 to event generator node 122, all potential paths leading up to event generator node 122 and assign a color to each node 120 along all potential paths. Activating event interest node 124 may include creating event interest node 124, configuring a feature (e.g., an Encapsulated Remote Switched Port Analyzer (ERSPAN) feature) on a network component (e.g., a router, a server, etc.), and the like. The color is a label for node 120 that indicates colored node 120 is subject to tracking.

When event generator node 122 is modified (e.g., changed, updated, etc.), event generator node 122 will traverse, from event generator node 122 to event interest node 124, all paths leading up to event interest node 124 and modify one or more of nodes 120 that have been assigned the color. In certain embodiments, the modification to event generator node 122 causes a depth first search (DFS) traversal of dependency graph 132 to all event interest nodes 124. Modifying event generator node 122 may include one or more of the following: changing a next-hop, changing a VOQ identification, changing an ECMP routing, or changing a LAG, etc.

If event interest node 124 is deactivated (e.g., deleted, removed, or disabled), event generator node 122 deletes the colors from nodes 120 assigned the color by deactivated event interest node 124. In certain embodiments, rather than deleting the colors from nodes 120 at the time event interest node 124 is deactivated, event generator node 122 "lazy deletes" the color from each colored node 120 the next time event generator node 122 is modified. For example, event generator node 122 may delete the color from each colored node 120 when another walk occurs and event generator node 122 discovers that event interest node 124 is no longer present. In some embodiments, event generator node 122 traverses, from event generator node 122 to event interest node 124, all paths that have been colored by event interest node 124 and deletes the colors from all colored nodes 120 during the path traversal. Once the colors have been deleted from nodes 120, further modifications to event generator node 122 will not cause any graph traversal. In certain embodiments, a lazy delete pruning algorithm is used to lazy delete the colors from each colored node 122.

Dependency graphs 132 of system 100 represent relationships between nodes 120 of system 100. Each dependency graph 132 includes a single event generator node 122 (i.e., the root node), multiple event interest nodes 124 (i.e., the leaf nodes), and multiple intermediate nodes 126 located along the potential paths between event generator node 122 and each event interest node 124. Each dependency graph 132 shows all potential paths between event generator node 122 and each event interest nodes 124.

Subgraphs 134 of system 100 are generated from dependency graphs 132. Each subgraph 134 represents all potential paths between event generator node 122 of dependency graph 132 and one unique event interest node 124 of dependency graph 132. For example, a first subgraph 134 may show all potential paths between event generator node 122 and a first event interest node 124 of dependency graph 132, a second subgraph 134 may show all potential paths between event generator node 122 and a second event interest node 124 of dependency graph 132, a third subgraph 134 may show all potential paths between event generator node 122 and a third event interest node 124 of dependency graph 132, and so on.

In certain embodiments, subgraphs 134 are dynamically created as a result of the colored paths. For example, first subgraph 134 may be dynamically created as nodes 120 associated with first event interest node 124 are assigned a first color (e.g., orange), second subgraph 134 may be dynamically created as nodes 120 associated with second event interest node 124 are assigned a second color (e.g., green), third subgraph 134 may be dynamically created as nodes 120 associated with third event interest node 124 are assigned a third color (e.g., yellow), and so on. In certain embodiments, once event interest node 124 is deactivated (e.g., deleted or disabled), its associated subgraph 134 is pruned (e.g., deleted) so that no further resources are wasted.

In operation, during compile time, graph generator 130 of system 100 generates dependency graph 132, which shows the relationships between nodes 120 of network 110. Dependency graph 132 includes all potential paths from event generator node 122 to a plurality of event interest nodes 124. Graph generator 130 then generates individual subgraphs 134 for each event interest node 124 of dependency graph 132. Each subgraph 134 includes all potential paths between event generator node 122 and the particular event interest node 124 of each subgraph 134. During run time, a first event interest node 124 is activated (e.g., created). Upon its activation, first event interest node 124 traverses all potential paths from first event interest node 124 to event generator node 122 and assigns a color (e.g., green) to all nodes 120 along all potential paths. When event generator node 122 is modified (e.g., updated), event generator node 122 traverses all nodes 120 that have been assigned the color and propagates the modifications to all colored nodes 120. As such, system 100 allows for graph traversal only when event interest node 124 has been activated.

Although FIG. 1 illustrates a particular arrangement of network 110, nodes 120, and graph generator 130, this disclosure contemplates any suitable arrangement of network 110, nodes 120, and graph generator 130. For example, graph generator 130 may operate on one or more nodes 120 of system 100. Although FIG. 1 illustrates a particular number of networks 110, nodes 120, and graph generators 130, this disclosure contemplates any suitable number of networks 110, nodes 120, and graph generators 130. For example, system 100 may include more or less than one graph generator 130.

FIG. 2 illustrates an example dependency graph 132 that may be used by system 100 of FIG. 1. In certain embodiments, dependency graph 132 is generated by graph generator 130 of FIG. 1 during compile time. Dependency graph 132 includes nodes 120. Nodes 120 include event generator node 122, event interest node 124, and intermediate nodes 126. While dependency graph 132 of FIG. 2 illustrates a single event interest node 124, any node 120 of dependency graph 132 other than event generator node 122 may represent an event interest node 124. Dependency graph 132 shows all potential paths from event generator node 122 to event interest node 124. Intermediate nodes 126 represent nodes 120 along the potential paths between event generator node 122 and event interest node 124.

Although FIG. 2 illustrates a particular arrangement of nodes 120, event generator node 122, event interest node 124, and intermediate nodes 126 for dependency graph 132, this disclosure contemplates any suitable arrangement of nodes 120, event generator node 122, event interest node 124, and intermediate nodes 126 for dependency graph 132.

For example, nodes 120 of dependency graph 132 may be arranged in a different order. Although FIG. 2 illustrates a particular number of nodes 120, event generator nodes 122, event interest nodes 124, intermediate nodes 126, and dependency graphs 132, this disclosure contemplates any suitable number of nodes 120, event generator nodes 122, event interest nodes 124, intermediate nodes 126, and dependency graphs 132. For example, FIG. 2 may include more than one dependency graph 132.

FIG. 3 illustrates an example subgraph 134 that may be generated from dependency graph 132 of FIG. 2. Subgraph 134 shows all potential paths between event generator node 122 and event interest node 124 of FIG. 1. In certain embodiments, subgraph 134 is generated by graph generator 130 of FIG. 1 during compile time. Subgraph 134 includes event generator nodes 122, event interest node 124, and intermediate nodes 126. Whereas dependency graph 132 of FIG. 2 shows all potential paths between event generator node 122 and a plurality of event interest nodes 124, subgraph 134 of FIG. 3 shows all potential paths between event generator node 122 and a particular event interest node 124. Intermediate nodes 126 represent nodes 120 of subgraph 134 along the potential paths between event generator node 122 and event interest node 124.

Although FIG. 3 illustrates a particular arrangement of nodes 120, event generator node 122, event interest node 124, and intermediate nodes 126 for subgraph 134, this disclosure contemplates any suitable arrangement of nodes 120, event generator node 122, event interest node 124, and intermediate nodes 126 for subgraph 134. For example, nodes 120 of subgraph 134 may be arranged in a different order. Although FIG. 3 illustrates a particular number of nodes 120, event generator nodes 122, event interest nodes 124, intermediate nodes 126, and subgraphs 134, this disclosure contemplates any suitable number of nodes 120, event generator nodes 122, event interest nodes 124, intermediate nodes 126, and subgraphs 134. For example, FIG. 3 may include more than one subgraph 134 (e.g., a different subgraph 134 for each event interest node 124 of dependency graph 132 of FIG. 2).

FIG. 4 illustrates an example run-time topology 400 of subgraph 134 of FIG. 3 prior to activation of event interest nodes 124. Pre-activation run-time topology 400 includes event generator node 122, event interest nodes 124 (i.e., event interest node 124a and event interest node 124b), intermediate nodes 126 (i.e., intermediate nodes 126a, 126b, 126c, 126d, 126e, 126f, and 126g), and excluded nodes 128 (i.e., excluded nodes 128a, 128b, 128c, and 128d). Intermediate nodes 126 of pre-activation run-time topology 400 are part of the potential path illustrated in subgraph 134 of FIG. 3. Intermediate nodes 126 represent nodes 120 that can be activated for path coloring. Excluded nodes 128 of pre-activation run-time topology 400 are not part of any potential path to event generator node 122 and therefore cannot be activated. In run-time topology 400 of FIG. 4, event interest nodes 124 have not been activated (e.g., created or enabled). When event interest nodes 124 are not activated, modifications (e.g., changes, updates, etc.) to event generator node 122 will not propagate back to intermediate nodes 126.

Although FIG. 4 illustrates a particular arrangement of event generator node 122, event interest nodes 124, intermediate nodes 126, and excluded nodes 128 for pre-activation run-time topology 400, this disclosure contemplates any suitable arrangement of event generator node 122, event interest nodes 124, intermediate nodes 126, and excluded nodes 128 for pre-activation run-time topology 400. For example, event interest node 124b may include multiple paths to event generator node 122. Although FIG. 4 illustrates a particular number of event generator nodes 122, event interest nodes 124, intermediate nodes 126, and excluded nodes 128 for pre-activation run-time topology 400, this disclosure contemplates any suitable number of event generator nodes 122, event interest nodes 124, intermediate nodes 126, and excluded nodes 128 for pre-activation run-time topology 400. For example, FIG. 4 may include more or less than two event interest nodes 124, more or less than seven intermediate nodes 126, and/or more or less than four excluded nodes 128.

FIG. 5 illustrates an example run-time topology 500 of subgraph 134 of FIG. 3 after activation of event interest node 124a. Post-activation run-time topology 500 includes event generator node 122, event interest nodes 124 (i.e., event interest node 124a and event interest node 124b), intermediate nodes 126 (i.e., intermediate nodes 126a, 126b, 126c, 126d, 126e, 126f, and 126g), and excluded nodes 128 (i.e., excluded nodes 128a, 128b, 128c, and 128d). Intermediate nodes 126 of post-activation run-time topology 500 are part of the potential path illustrated in subgraph 134 of FIG. 3. Intermediate nodes 126 represent nodes 120 that can be activated for path coloring. Excluded nodes 128 of post-activation run-time topology 500 are not part of any potential path to event generator node 122 and therefore cannot be activated. In post-activation run-time topology 500 of FIG. 5, event interest node 124a has been activated (e.g., enabled, created, etc.).

In response to the activation of event interest node 124a, intermediate nodes 126a, 126b, 126d, and 126f along the path from event interest node 124a to event generator node 122 are assigned a color (e.g., green), which allows for tracking between event interest node 124a and event generator node 122. In certain embodiments, event interest node 124a assigns the color to intermediate nodes 126 during a forward walk to event generator node 122. After intermediate nodes 126 have been assigned the color, modifications (e.g., changes, updates, etc.) to event generator node 122 propagate back to intermediate nodes 126a, 126b, 126d, and 126f. However, modifications to event generator node 122 will not propagate back to intermediate nodes 126c, 126e, and 126g since event interest node 124b has not been activated.

Although FIG. 5 illustrates a particular arrangement of event generator node 122, event interest nodes 124, intermediate nodes 126, and excluded nodes 128 for post-activation run-time topology 500, this disclosure contemplates any suitable arrangement of event generator node 122, event interest nodes 124, intermediate nodes 126, and excluded nodes 128 for post-activation run-time topology 500. For example, in certain embodiments, event interest node 124b may be activated in addition to or in lieu of the activation of event interest node 124a. Although FIG. 5 illustrates a particular number of event generator nodes 122, event interest nodes 124, intermediate nodes 126, and excluded nodes 128 for post-activation run-time topology 500, this disclosure contemplates any suitable number of event generator nodes 122, event interest nodes 124, intermediate nodes 126, and excluded nodes 128 for post-activation run-time topology 500. For example, FIG. 5 may include more or less than two event interest nodes 124, more or less than seven intermediate nodes 126, and/or more or less than four excluded nodes 128.

FIG. 6 shows an example method 600 for assigning colors to nodes of a subgraph. Method 600 begins at step 605. At step 610, a graph generator (e.g., graph generator 130 of FIG. 1) of a system (e.g., system 100 of FIG. 1) generates a dependency graph (e.g., dependency graph 132 of FIG. 2) using nodes of a network (e.g., nodes 120 of network 110 of FIG. 1). The graph generator generates the graph during compile time. The dependency graph includes all potential paths between an event generator node (e.g., event generator node 122 of FIG. 1) and a plurality of event interest nodes (e.g., event interest nodes 124 of FIG. 1). Method 600 then moves from step 610 to step 615.

At step 615 of method 600, the graph generator generates a subgraph (e.g., subgraph 134 of FIG. 3) from the dependency graph. The graph generator generates the subgraph during compile time. The subgraph includes all potential paths between the event generator node and a particular event interest node. In certain embodiments, the graph generator generates a separate subgraph for each event interest node of the dependency graph. Method 600 then moves from step 615 to step 620.

At step 620 of method 600, the event interest node is activated (e.g., enabled, created, etc.). The event interest node may be activated by enabling a feature on a node of the network. For example, the event interest node may be activated upon the configuration of ERSPAN on a router. Method 600 then moves from step 620 to step 625, where a color is assigned to one or more nodes along the potential paths of the subgraph during a forward walk from the event interest node to the event generator node. For example, referring to FIG. 5, event interest node 124a may assign the color green to intermediate nodes 126a, 126b, 126d, and 126f as event interest node 124a traverses the available paths to event generator node 122. In certain embodiments, the activation of the event interest node triggers the forward walk and coloring of the nodes along the paths between the activated event interest node and the event generator node. Method 600 then moves from step 625 to step 630.

At step 630 of method 600, the system determines whether the event generator node has been modified. Modifications to the event generator node may include changing a next-hop, changing a VOQ identification, changing an ECMP routing, changing a LAG, and the like. If the event generator node has not been modified, method 600 advances from step 630 to step 640. If the event generator node has been modified, the event generator node propagates the modifications to the colored nodes. For example, referring to FIG. 4, event generator node 122 may back walk along colored intermediate nodes 126f, 126d, 126b, and 126a to event interest node 124a and propagate the modifications to the colored intermediate nodes. Method 600 then moves from step 635 to step 640.

At step 640 of method 600, the system determines whether the event interest node has been deactivated (e.g., disabled, deleted, etc.). The event interest node may be deactivated by deleting the event interest node or disabling a feature on the event interest node. For example, referring to FIG. 4, event interest node 124a may be deactivated upon deleting event interest node 124a or disabling the ERSPAN feature on event interest node 124a. If the event interest node has not been deactivated, method 600 advances from step 640 to step 650, where method 600 ends. If, at step 640, the event generator node has been deactivated, method 600 moves from step 640 to step 645. At step 645, the event generator node deletes the colors that have been assigned to the nodes during a back walk from the event generator node to the event interest node. For example, referring to FIG. 4, event generator node 122 may back walk along colored nodes 126f, 126d, 126b, and 126a and delete the color from each of these nodes. Method 600 then moves from step 645 to step 650, where method 600 ends.

Although this disclosure describes and illustrates an example method 600 for assigning colors to nodes of a subgraph including the particular steps of the method of FIG. 6, this disclosure contemplates any suitable method 600 for assigning colors to nodes of a subgraph, including any suitable steps, which may include all, some, or none of the steps of the method of FIG. 6, where appropriate.

Although this disclosure describes and illustrates particular steps of method 600 of FIG. 6 as occurring in a particular order, this disclosure contemplates any suitable steps of method 600 of FIG. 6 occurring in any suitable order. Although this disclosure describes and illustrates particular components, devices, or systems carrying out particular steps of method 600 of FIG. 6, this disclosure contemplates any suitable combination of any suitable components, devices, or systems carrying out any suitable steps of method 600 of FIG. 6.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. As an example and not by way of limitation, computer system 700 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a Wi-Fi network, a Wi-MAX network, a cellular telephone network (such as, for example, a Global System for Mobile Communications (GSM) network, a 3G/Universal Mobile Telecommunications Service (UMTS) network, a LTE network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages. The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A router, comprising:
   one or more processors; and
   one or more computer-readable non-transitory storage media coupled to the one or more processors and comprising instructions that, when executed by the one or more processors, cause the router to perform operations comprising:
      generating a subgraph from a dependency graph, wherein:
         the subgraph comprises all available paths between an event interest node and an event generator node of the dependency graph; and
         the event generator node indicates a state of a network function element;
      activating the event interest node;
      assigning, in response to activating the event interest node, a color to nodes along all of the available paths of the subgraph from the event interest node to the event generator node, wherein the color is a single color;

modifying the event generator node to update the state of the network function element;
modifying, in response to updating the state of the network function element, the nodes along all of the available paths of the subgraph from the event generator node to the event interest node;
deactivating the event interest node;
back walking, in response to deactivating the event interest node, along the nodes that have been assigned the color, and
deleting, while back walking along the nodes that have been assigned the color, the color from the nodes along all of the available paths of the subgraph from the event generator node to the event interest node.

2. The router of claim 1, wherein:
generating the subgraph from the dependency graph occurs during a compile time; and
assigning the color to the nodes along all of the available paths of the subgraph occurs during a run time.

3. The router of claim 1, wherein updating the state of the network function element comprises one of the following:
changing a next-hop;
changing a virtual output queueing (VOQ) identification;
changing an equal-cost multi-path (ECMP) routing; or
changing a link aggregation group (LAG).

4. The router of claim 1, the operations further comprising:
defining relationships between a plurality of nodes of the dependency graph; and
generating a plurality of subgraphs from the dependency graph, wherein each of the plurality of subgraphs comprises the event generator node and a unique event interest node.

5. The router of claim 1, wherein activating the event interest node comprises configuring a feature on the router.

6. The router of claim 1, wherein the color is a label indicating that the node is subject to a tracking.

7. A method, comprising:
generating a subgraph from a dependency graph, wherein:
the subgraph comprises all available paths between an event interest node and an event generator node of the dependency graph; and
the event generator node indicates a state of a network function element;
activating the event interest node;
assigning, in response to activating the event interest node, a color to nodes along all of the available paths of the subgraph from the event interest node to the event generator node, wherein the color is a single color;
modifying the event generator node to update the state of the network function element;
modifying, in response to updating the state of the network function element, the nodes along all of the available paths of the subgraph from the event generator node to the event interest node;
deactivating the event interest node;
back walking, in response to deactivating the event interest node, along the nodes that have been assigned the color, and
deleting, while back walking along the nodes that have been assigned the color, the color from the nodes along all of the available paths of the subgraph from the event generator node to the event interest node.

8. The method of claim 7, wherein:
generating the subgraph from the dependency graph occurs during a compile time; and
assigning the color to the nodes along all of the available paths of the subgraph occurs during a run time.

9. The method of claim 7, wherein updating the state of the network function element comprises one of the following:
changing a next-hop;
changing a virtual output queueing (VOQ) identification;
changing an equal-cost multi-path (ECMP) routing; or
changing a link aggregation group (LAG).

10. The method of claim 7, further comprising:
defining relationships between a plurality of nodes of the dependency graph; and
generating a plurality of subgraphs from the dependency graph, wherein each of the plurality of subgraphs comprises the event generator node and a unique event interest node.

11. The method of claim 7, wherein activating the event interest node comprises configuring a feature on a router.

12. The method of claim 7, wherein the color is a label indicating that the node is subject to tracking.

13. One or more computer-readable non-transitory storage media embodying instructions that, when executed by a processor, cause the processor to perform operations comprising:
generating a subgraph from a dependency graph, wherein:
the subgraph comprises all available paths between an event interest node and an event generator node of the dependency graph; and
the event generator node indicates a state of a network function element;
activating the event interest node;
assigning, in response to activating the event interest node, a color to nodes along all of the available paths of the subgraph from the event interest node to the event generator node, wherein the color is a single color;
modifying the event generator node to update the state of the network function element;
modifying, in response to updating the state of the network function element, the nodes along all of the available paths of the subgraph from the event generator node to the event interest node;
deactivating the event interest node;
back walking, in response to deactivating the event interest node, along the nodes that have been assigned the color, and
deleting, while back walking along the nodes that have been assigned the color, the color from the nodes along all of the available paths of the subgraph from the event generator node to the event interest node.

14. The one or more computer-readable non-transitory storage media of claim 13, wherein:
generating the subgraph from the dependency graph occurs during a compile time; and
assigning the color to the nodes along all of the available paths of the subgraph occurs during a run time.

15. The one or more computer-readable non-transitory storage media of claim 13, wherein updating the state of the network function element comprises one of the following:
changing a next-hop;
changing a virtual output queueing (VOQ) identification;
changing an equal-cost multi-path (ECMP) routing; or
changing a link aggregation group (LAG).

16. The one or more computer-readable non-transitory storage media of claim 13, the operations further comprising:

defining relationships between a plurality of nodes of the dependency graph; and generating a plurality of subgraphs from the dependency graph, wherein each of the plurality of subgraphs comprises the event generator node and a unique event interest node.

17. The one or more computer-readable non-transitory storage media of claim 13, wherein activating the event interest node comprises configuring a feature on a router.

* * * * *